(12) United States Patent
Singla et al.

(10) Patent No.: US 9,830,451 B2
(45) Date of Patent: Nov. 28, 2017

(54) DISTRIBUTED PATTERN DISCOVERY

(71) Applicant: HEWLETT-PACKARD DEVELOPMENT COMPANY, L.P., Houston, TX (US)

(72) Inventors: Anurag Singla, Sunnyvale, CA (US); Zhipeng Zhao, Sunnyvale, CA (US); Fei Gao, Sunnyvale, CA (US)

(73) Assignee: EntIT Software LLC, Sunnyvale, CA (US)

( * ) Notice: Subject to any disclaimer, the term of this patent is extended or adjusted under 35 U.S.C. 154(b) by 0 days.

(21) Appl. No.: 14/647,833

(22) PCT Filed: Nov. 30, 2012

(86) PCT No.: PCT/US2012/067332
§ 371 (c)(1),
(2) Date: May 28, 2015

(87) PCT Pub. No.: WO2014/084849
PCT Pub. Date: Jun. 5, 2014

(65) Prior Publication Data
US 2015/0317476 A1   Nov. 5, 2015

(51) Int. Cl.
*G06F 21/55* (2013.01)
*G06F 21/56* (2013.01)
*H04L 29/06* (2006.01)

(52) U.S. Cl.
CPC ......... *G06F 21/552* (2013.01); *G06F 21/55* (2013.01); *G06F 21/554* (2013.01); *G06F 21/56* (2013.01); *H04L 63/1425* (2013.01); *H04L 63/1433* (2013.01); *G06F 2221/034* (2013.01)

(58) Field of Classification Search
CPC ....... G06F 21/55; G06F 21/552; G06F 21/554
See application file for complete search history.

(56) References Cited

U.S. PATENT DOCUMENTS

| 6,618,725 | B1* | 9/2003 | Fukuda ............ G06F 17/30719 |
| 6,708,163 | B1 | 3/2004 | Kargupta et al. |
| 6,725,377 | B1* | 4/2004 | Kouznetsov ............ G06F 21/55 709/223 |
| 7,352,280 | B1* | 4/2008 | Rockwood ............. G06F 21/55 340/521 |
| 7,668,942 | B2 | 2/2010 | Tiwari et al. |
| 7,953,685 | B2 | 5/2011 | Liu et al. |
| 8,073,859 | B2 | 12/2011 | Wong et al. |
| 2002/0091680 | A1* | 7/2002 | Hatzis ............... G06F 17/30424 |

(Continued)

FOREIGN PATENT DOCUMENTS

| CN | 101931570 B | 12/2010 |
| CN | 101996102 B | 3/2011 |
| WO | WO-2007147166 A1 | 12/2007 |

OTHER PUBLICATIONS

Itkar et al., "Distributed Algorithm for Frequent Pattern Mining using HadoopMap Reduce Framework", 2013, pp. 15-24.*

(Continued)

*Primary Examiner* — Thaddeus Plecha

(57) ABSTRACT

Example embodiments disclosed herein relate to distributed pattern discovery. A local frequent pattern tree or local frequent pattern trees can be merged. The merging can be based on activities or transactions associated with the local frequent pattern tree or trees.

17 Claims, 6 Drawing Sheets

(56) References Cited

U.S. PATENT DOCUMENTS

| | | |
|---|---|---|
| 2004/0255157 A1 | 12/2004 | Ghanea-Hercock |
| 2007/0209074 A1 | 9/2007 | Coffman |
| 2009/0064333 A1 | 3/2009 | Saurabh et al. |
| 2009/0144820 A1 | 6/2009 | Kurapati et al. |
| 2010/0017870 A1 | 1/2010 | Kargupta et al. |
| 2010/0319069 A1 | 12/2010 | Granstedt et al. |
| 2011/0184922 A1* | 7/2011 | Lee .................. G06F 17/30985 707/693 |

OTHER PUBLICATIONS

Javed et al. "Frequent Pattern Mining on Message Passing Multiprocessor Systems", 2004, pp. 321-334.*

International Search Report & Written Opinion, Aug. 27, 2013, PCT Patent Application No. PCT/US2012/067332, 11 pages.

Naveenkumar, A.S., et al., Applications of Distributed Mining Techniques for Knowledge Discovery in Dispersed Sensory Data, 2011, International Journal of Computer Trends and Technology, vol. 2, Issue, 2, pp. 115-123.

Extended European Search Report, EP Application No. 12889263.5, Date: Jun. 27, 2016, pp. 1-7, EPO.

He, Bo, Abstract of "Distributed algorithm for mining association rules based on FP-tree", China Academic Journal Electronic Publishing House, vol. 27, No. 4, Apr. 15, 2012, 5 pages.

Xun et al., English Abstract of "Distributed constructing algorithm of frequent pattern tree based on grid", Computer Engineering and Applications, Nov 1, 2011. 47(31): pp. 128-131.

Peng Guo-Xing, Research on Intrusion Detection Model Based on Distributed Data, College of Computer and Communication Hunan University of Technology, 2007 (4 pages) (Chinese language document; English Abstract provided).

* cited by examiner

DISTRIBUTED PATTERN DISCOVERY

BACKGROUND

Security Information and Event Management (SIEM) technology provides real-time analysis of security alerts generated by network hardware and applications. SIEM technology can detect possible threats to a computing network. These possible threats can be determined from an analysis of security events.

BRIEF DESCRIPTION OF THE DRAWINGS

The following detailed description references the drawings, wherein.

DETAILED DESCRIPTION

Figure 1:
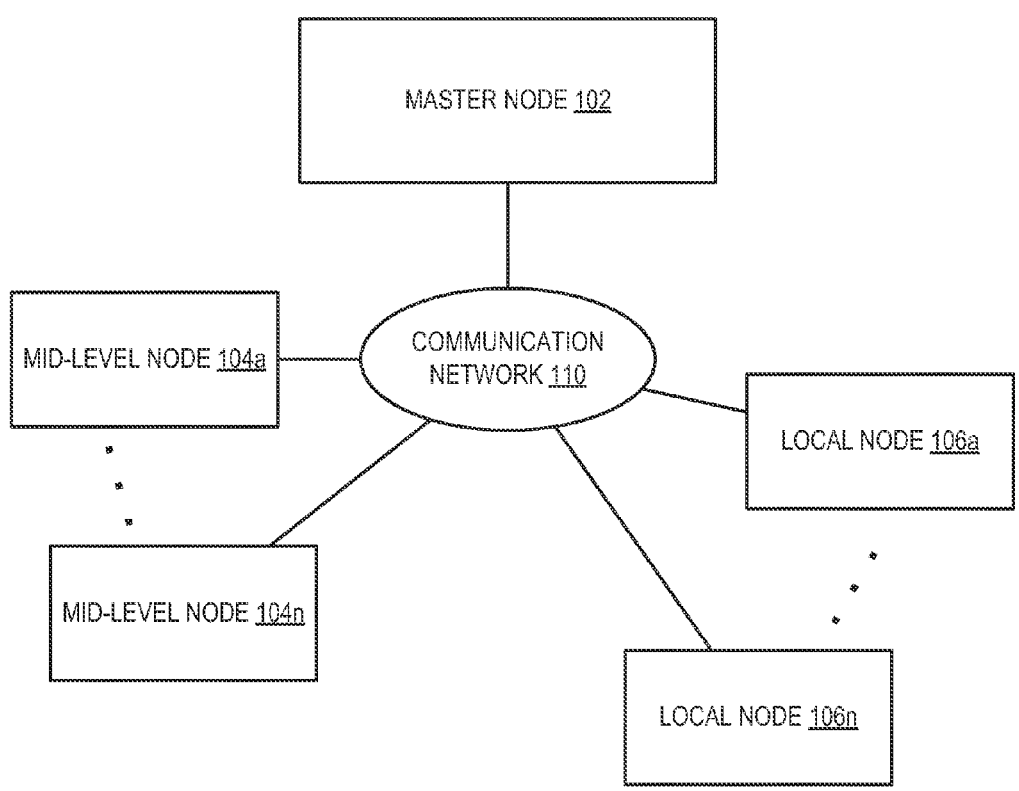
FIG. 1-3 are block diagrams of computing systems for distributed pattern discovery, according to various examples.

Pattern discovery is a data mining based preemptive approach to solve many challenges faced by a security information and event management (SIEM) system. With the proliferation of big security data and the advance collaborative techniques employed by professional information attackers, various challenges are being faced by SEM systems such as zero day vulnerabilities explorations, slow attacks, long term penetration spreading from one system to another, and exfiltration of information. Further, hackers are adding new weapons, which have not been seen before, into their arsenals.

A preemptive approach can be used to detect system anomalies not by matching the known signatures, but by correlating security information and discovering the unknown patterns of traces in the system. Pattern Discovery in SIEMs is a powerful approach determining these vulnerabilities. An associate mining algorithm can be used on the data in the system to detect patterns, which, in one example, can be frequent co-occurring events across different transactions. These patterns may be developed by tracing the system and once confirmed as malicious, the patterns can be used for real time system monitoring and analysis.

In certain examples, security information/event management for networks may include collecting data from networks and network devices that reflects network activity and/or operation of the devices and analyzing the data to enhance security. Examples of network devices may include firewalls, intrusion detection systems, servers, workstations, personal computers, etc. The data can be analyzed to detect patterns, which may be indicative of an attack or anomaly on the network or a network device. The detected patterns may be used, for example, to locate those patterns in the data. For example, the patterns may be indicative of activities of a worm or another type of computer virus trying to gain access to a computer in the network and install malicious software.

The data that is collected from networks and network devices is for events. An event may be any activity that can be monitored and analyzed. Data captured for an event is referred to as event data. The analysis of captured event data may be performed to determine if the event is associated with a threat or some other condition. Examples of activities associated with events may include logins, logouts, sending data over a network, sending emails, accessing applications, reading or writing data, port scanning, installing software, etc. Event data may be collected from messages, log file entries, which is generated by a network device, or from other sources. Security systems may also generate event data, such as correlation events and audit events. In some instances, one thousand events per second may be generated. This can amount to 100 million events per day or three billion events per month.

In some examples, anomaly detection can also be achieved by building a baseline of the normal patterns of the system, which has been learned off line. When any anomaly occurs, the system can detect the new patterns and alert system management. Pattern discovery on a single node of a SIEM can be limited by the system resources (e.g. memory, 10 bandwidth with a database (DB), etc.) so that it may lack the capacity to handle big data, which is common in a state-of-art enterprise security system.

Accordingly, various embodiments disclosed herein relate to distributed pattern discovery in SIEMs. Approaches described herein allow pattern discovery on SIEMs to be parallelized. For example, a batch mode solution can be implemented to big data security information management domain. A distributed pattern discovery engine can explore large amounts of data to harvest patterns in a multi-stage distributed manner. Local nodes can generate local pattern trees. The local pattern trees can be sent to a merging node that can merge the local pattern trees into a global pattern tree. The global pattern tree can be back propagated to the local nodes. In certain examples, a security function can be performed using the global pattern tree and/or local pattern trees. Moreover, in some examples, a pattern tree can include information about potential patterns. The information can include the actual potential patterns and/or point to the potential patterns. Further, the local pattern tree can include or be associated with support information and/or length information of potential patterns.

The distributed approach can partition data into the different local nodes to avoid data intensive IO bottlenecks. Further, the approaches parallelize transaction construction and local frequent pattern tree generation to avoid computation intensive bottlenecks.

With these approaches, local nodes first examine event components and identify groups of correlated events as transactions. Frequent item sets are then determined. In certain examples, frequent items sets are groups of correlated events that occur frequently together across different transactions. As such, one or more security events can be included in a transaction. Some of these frequent item sets, which can be customized, for example, to satisfy criteria specified by a consumer, are the trace for malicious attacks and could be used as signatures for further analysis.

This can be a case of associate item set mining, which can be formally stated as following: Let $1=\{a_1, a_2, a_3, \ldots, a_m\}$ be a set of items, and transaction database DB is a set of subset of I, denoted by $DB=\{T_1, T_2, T_3, \ldots, T_n\}$ where $T_i$ ($1 \leq i \leq n$) is called a transaction. The support of a potential pattern A, denoted by supp(A), is the number of the transactions containing A in a DB and the length of the potential pattern A, denoted by length(A), is the number of the items in A. In one example, A is considered a frequent pattern if and only if $supp(A) \geq \xi_1$ and $length(A) \geq \xi_2$, where $\xi_1$ is a pre-defined threshold for pattern support and $\xi_2$ is a pre-defined threshold for pattern length. Examples of items can include fields and parameters for pattern discovery. A pattern length can be considered a number of activities.

According to an example, fields and parameters are selected for pattern discovery. Events in event data may have a multitude of attributes. The event data may be stored according to fields associated with the attributes of the events in the event data. A field, for example, is an attribute describing an event in the event data. Examples of fields include dale/time of event, event name, event category, event ID, source address, source MAC address, destination address, destination MAC address, user ID, user privileges, device customer string, etc. The event data may be stored in a table comprised of the fields. In some cases, hundreds of fields reflecting different event attributes may be used to store the event data.

For pattern discovery, some of the fields are selected. For example, the selected fields may include a set of the fields from the table. The number of fields in the set may include one or more of the fields from the table. The fields selected for the set may be selected based on various statistics and may be stored in a pattern discovery profile. A pattern discovery profile is any data used to discover patterns in event data. The pattern discovery profile may include the set of fields, parameters and other information for pattern discovery.

In addition to including fields, parameters may be used for pattern discovery. The parameters may be included in pattern discovery profiles for pattern discovery. The parameters may specify conditions for the matching of the fields in the pattern discovery profile to event data to detect patterns. Also, the parameters may be used to adjust the number of patterns detected. One example of a parameter is pattern length that is a number of activities. The pattern length parameter may represent a minimum number of different activities that were performed for the activities to be considered a pattern. Another example of a parameter is a repeatability parameter that may represent a minimum number of times the different activities are repeated for them to be considered a pattern. In one example, repeatability is associated with two fields. For example, repeatability may be represented as different combinations of source and target fields across which the activity is repealed. A minimum number of different combinations of source and target IP addresses is an example of a repeatability parameter. These parameters may be adjusted until a predetermined amount of matching patterns is identified.

In certain examples, a pattern is a sequence of a plurality of different activities such as transactions. Frequent patterns can be detected as potential patterns that meet certain parameters, such as support and length. In an example of a pattern, the sequence of activities includes scan ports, identify open port, send packet with particular payload to the port, login to the computer system and store a program in a particular location on the computer system.

Also, patterns that are repeated are identified. For example, if a plurality of different activities is repeated, it may be considered a repetitive pattern. Also, a pattern may be between two computer systems. So the pattern can include a source field and a target field associated with the different computer systems. In one example, the source and target fields are Internet protocol (IP) addresses of the computer systems. The source and target fields describe the transaction between computer systems. Pattern activity may also be grouped together by other fields in addition or in lieu of one of the source and target fields. In one example, the pattern activity may be analyzed across User IDs to identify the sequence or collection of activity repeated by multiple users. In another example, the pattern activity may be analyzed across Credit Card Numbers or Customers to identify the sequence or collection of activity across multiple credit card accounts.

Other event fields, in addition or in lieu of one of the source and target fields may be included in a pattern discovery profile. In one example, a field is used to identify a specific pattern and is referred to as a pattern identification field. In one example, the pattern identification field is event name or event category. In another example, it can be the credit card transaction amount. In yet another example, it can be an Event Request URL field to detect application URL access patterns.

One simplistic example of a pattern for a virus is as follows. One event is a port scan. Scanning of the port happens on a source machine. The next event is sending a packet to the target machine. The next event can be a login to the target machine. The next event may be a port scan at the target machine and repetition of the other events. In this way, the virus can replicate. By detecting the repeated events as a pattern, the virus may be detected. For example, a selected field for pattern discovery may be event name and the repeatability parameter is 4 and the number of activities parameter is 3. The unique events that are detected have event names of port scan, packet transmission and login on target/destination machine. The number of events is 3. This pattern includes 3 different events (e.g., port scan, packet transmission and login on target/destination machine), which satisfies the number of activities parameter. If this pattern is detected at least a support number of times, for example during a pattern discovery run, then it satisfies the repeatability parameter, and it is considered a pattern match. A notification message or another type of alert may be generated.

Multiple pattern discovery profiles may be created to detect a variety of different parameters, if a pattern is detected, actions may be performed. For example if pattern represents an attack on network security, then notifications, alerts or other actions may be performed to stop the attack. Other actions may include displaying the events in the patterns for analysis by a network administrator.

Figure 2:
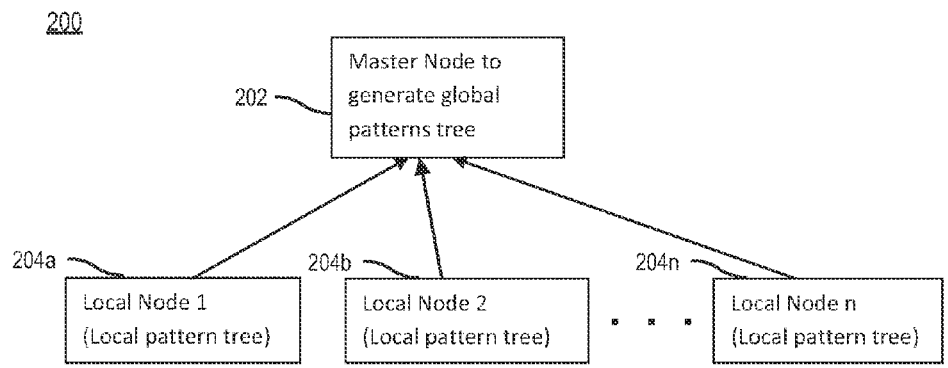
Figure 3:
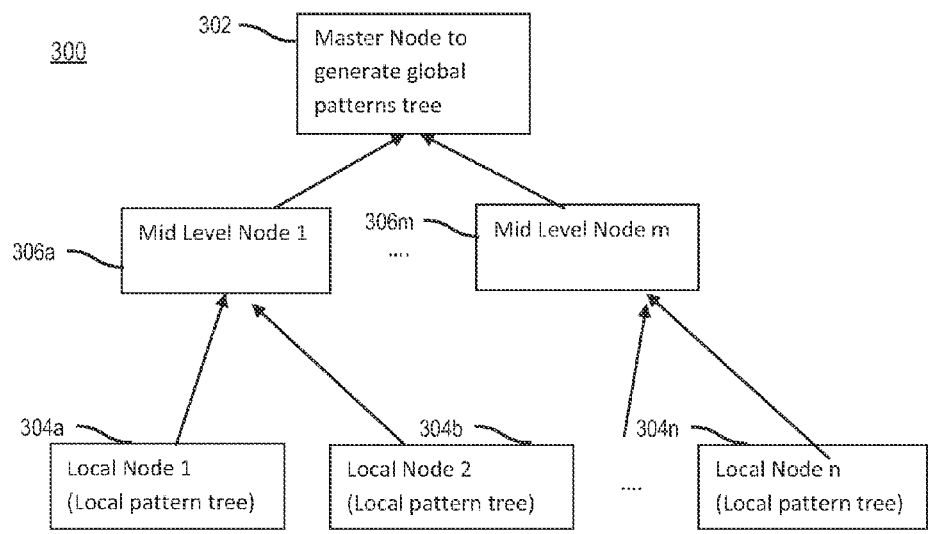

FIG. 1-3 are block diagrams of computing systems for distributed pattern discovery, according to various examples. System 100 can include a master node 102 that communicates with mid-level nodes 104a-104n and/or local nodes 106a-106b via a communication network 110. In certain examples, the nodes 102, 104, 106 are computing devices, such as servers, client computers, desktop computers, mobile computers, etc. The nodes 102, 104, 106 can be implemented via a processing element, memory, and/or other components. In certain examples, mid-level nodes 104 can be considered local nodes 106 that can also perform additional functionality.

Local nodes 106 can receive a pattern discovery profile from the master node 102. In one example, a pattern discovery profile is a collection of parameters that can be used for a pattern discovery task. In some examples, a profile can be customized by a customer, end user, administrator, etc. to perform the specified pattern discovery task. The master node 102 can generate the pattern discovery profile.

Each of the individual nodes can query data to construct transactions for its local frequent pattern tree. In certain examples, each of the local nodes 106 can be communicatively connected to one or more databases. These databases can include the data to construct the transactions. In some examples, the local nodes 106 are connected to the same database and/or a portion of the same or replica database. In other examples, one or more of the databases can be different. In one example, the database can be a single database and each node can be responsible for a partition of the single database. In another example, the databases can belong to different businesses, business groups, etc. of a company. As such, data can be correlated between different business units of an organization.

The local nodes 106 then query data associated with the respective nodes 106 to construct transactions for its local pattern tree. In one example, support of a pattern is computed as the occurrence of an item set from different transactions. As such, it would be beneficial to remove duplicate items in one transaction for correct counting.

Because the data from one transaction might be distributed across multiple nodes 106, to achieve this, in one example, transaction information can be maintained for handling during tree generation described below or to aggregate data of one transaction into one node to build a local growth tree.

In one example, the same transaction data can be processed across multiple nodes 106. In this approach, for each node 106 a support number is kept. Also, an annotation field can be kept for the transaction the node 106 belongs to. In a later tree merging stage described below, when the master node 102 is receiving the transactions passed from other nodes and adding to its local frequent pattern tree, transaction annotation is checked against whether an item from the same transaction has already been added to the tree. As such, duplicate transactions can be avoided across nodes 106.

In another example, a single transaction is processed at a single node 106. In this example, all data from one transaction is processed by a single local node 106 during local frequent pattern tree generation. With this approach, the transaction annotation need not be included in the local frequent pattern trees.

In one example, the master node 102 issues a query for the number of transactions in the system 100. Assuming there are n nodes in the distributed system 100, the master node 102 partitions the transactions into n parts and gets transaction partition boundary information. Then, the master node 102 sends the boundary information to each of the local nodes 106 respectively.

After receiving the boundary information, each node 106 integrates it as a where clause into its pattern discovery query to retrieve its data across different databases for its specific transaction partition. In some examples, each node 102, 104, 106 can be associated with a database. As such, the data can be retrieved via other nodes. With this approach, all data from one transaction in the distributed system can be retrieved into one node 106 to build local frequent pattern tree.

Then, local trees are generated. Each individual local node 106 builds its own local pattern tree and keeps a local information table for the number of items occurring during the tree construction. In the case of processing same transaction data on one local node 106, the local information can be a local item counter table. In the case of processing same transaction data across multiple nodes 106, the local information can be a local item and transaction pair counter table. After each local frequent pattern tree is constructed, the local information table is sent to the master node 102 to build a global item counter table.

In one example, the global item counter table is sorted in descending order and the items that are less than the support threshold $\xi_1$ are removed. In other examples, the global item counter table need not be sorted to remove items that do not have threshold support. The master node 102 can then send the global item counter table to the other nodes 104, 106. Each node 104, 106 gets the global item counter table from master node 102 and reconstructs and prunes its local frequent pattern tree according to the global item counter table.

Patterns extracted from a local frequent pattern trees are extracted as transactions and sent to the master node 102 for tree merging. After receiving these transactions, the master node 102 adds the transactions to its local frequent pattern tree to generate a global frequent pattern tree. Then, in one example, the global frequent pattern tree at master node 102 is pruned by removing all paths in the tree whose length is less than $\xi_2$ and all nodes in the tree whose support is less than the $\xi_1$. Then, the patterns extracted from the global pattern tree are returned to the other nodes 104, 106.

The final global pattern tree can be used by the nodes to perform security functions. For example, each node can be a local instance of a SIEM. Each instance can use the patterns to look at incoming data and perform a security function, such as flagging a transaction as questionable, malicious, etc. Other functions can include sandboxing an item, sending alerts (e.g., emails, messages, etc.) to an administrator or other entity, or the like. In one example, the pattern can be flagged as malicious or otherwise considered a threat and when the pattern is detected, an approach can be taken to deal with the threat.

In certain examples, mid-level nodes 104 can be used to perform some of the functions of the master node 102. In one example, a mid-level node 104 can act as a master node for a set of local nodes. A mid-level pattern tree that is global to the set and the mid-level node 104 can be generated based on the information associated with the set. Then, the mid-level nodes 104 can generate and propagate the mid-level pattern trees to another mid-level node that is higher in a hierarchy or to the master node 102, which is at the top of the hierarchy. The global frequent pattern tree can be propagated to each of the nodes.

The communication network 110 can use wired communications, wireless communications, or combinations thereof. Further, the communication network 110 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 110 can be in the form of a direct network link between devices. Various communications structures and infrastructure can be utilized to implement the communication network(s).

By way of example, the nodes 102, 104, 106 communicate with each other and other components with access to the communication network 110 via a communication protocol or multiple protocols. A protocol can be a set of rules that defines how nodes of the communication network 110 interact with other nodes. Further, communications between network nodes can be implemented by exchanging discrete packets of data or sending messages. Packets can include header information associated with a protocol (e.g., information on the location of the network node(s) to contact) as well as payload information.

FIG. 2 shows a master-slave computing system 200 for distributed pattern discovery, according to one example. In this system 200, a master node 202 interacts with local nodes 204a-204n to generate a global frequent pattern tree. In certain examples, the master node 202 is also a local node. Further, each of the nodes can be an instance of a SIEM.

FIG. 3 shows a hierarchical system 300 for distributed pattern discovery, according to one example. In this example, the master node 302 can be used to generate global pattern trees. The local nodes 304a-304n can be used to generate local pattern trees that are propagated to associated mid-level nodes 306a-306m. These mid-level nodes 306 can be used to form mid-level frequent pattern trees in a similar fashion to a master node generating a global pattern tree. The mid-level nodes 306 can then provide the mid-level frequent pattern trees to other mid-level nodes higher in the hierarchy, leading to a master node 302. The master node 302 can take the frequent pattern trees from the mid-level nodes 306 and/or other local nodes and generate a global frequent pattern tree. In certain examples, mid-level nodes do not prune the trees. As such, the support can be provided by all of the nodes instead of a subset associated with a respective mid-level node 306.

Figure 4:
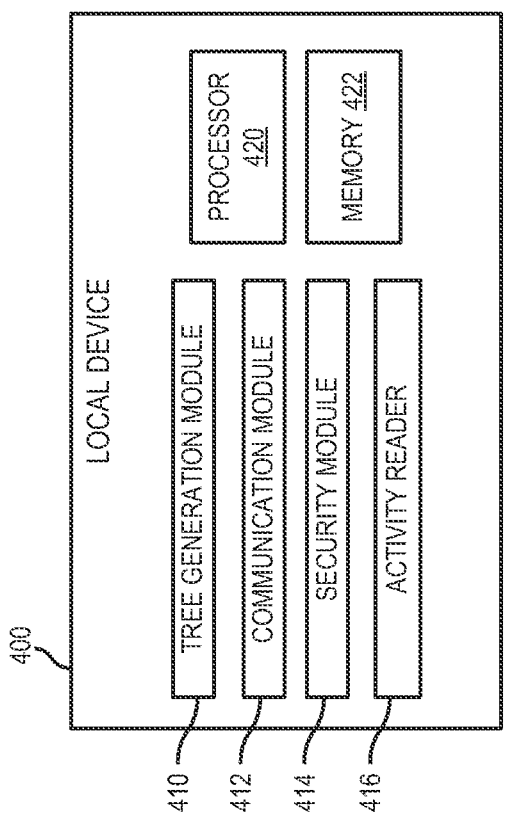
FIG. 4 is a block diagram of a local device, according to one example.

FIG. 4 is a block diagram of a local device, according to one example. In this example, the local device 400 includes a tree generation module 410, a communication module 412, a security module 414, an activity reader 416, a processor 420, and memory 422. As detailed herein, local device 400 may generate a local frequent pattern tree, for example, using the processes of FIG. 6.

The local device 400 can represent one of the nodes of a system. In certain examples, the local device 400 can represent an instance of a SEEM. In various examples, the local device 400 can be a local node, a mid-level node, or a master node.

In one example, the local device 400 is a local node. The security module 414 can perform security functionality for the local device 400. For example, the security module 414 can perform a real-time analysis of security alerts generated by network hardware and applications. As such, the security module 414 can generate a database of security information and events. The security information and events (e.g., via various types of logs, authentication information, input/output, etc.) can represent items and/or transactions that can be data mined to generate frequent pattern trees of potential patterns. Local frequent pattern trees can be correlated to determine patterns. The patterns can then be used to identify an occurrence of an event that matches the pattern.

An activity reader 416 can read the database to help generate a frequent pattern tree. A frequent pattern tree can be determined based on one or more profiles of what to look for. The profiles can be generated at a master node and provided to the local nodes. In one example, the tree generation module 410 can generate a local frequent pattern tree from the database. As noted above, the database can be associated with the local device 400, can be a partition or subset of another database that other nodes can be associated with, can be a combination of multiple smaller databases, or the like.

The local device 400 can use a communication module 412 to receive a profile. Further, the local device 400 can use the communication module 412 to send the local frequent pattern tree to another node. The other node can be a master node or a mid-level node in a hierarchy.

The local device 400 can also receive a global pattern tree of frequent patterns from the master node or a mid-level node of the system. The global pattern tree can be used with the local frequent pattern tree to perform a security function. In some examples, the tree generation module 410 can be updated based on the global pattern tree.

Local device 400 may be a server, a desktop computer, a workstation, a laptop computer, or any other computing device capable of generating a local frequent pattern tree and/or performing SIEM functionality. Processor 420 may be a CPU, GPU, or microprocessor suitable for retrieval and execution of instructions and/or electronic circuits configured to perform the functionality of any of the modules 410, 412, 414, 416 described herein.

As detailed herein, local device 400 may include a series of modules 410, 412, 414, 416 for generating a local frequent pattern tree. Each of the modules 410, 412, 414, 416 may include, for example, hardware devices including electronic circuitry for implementing the functionality described herein. In addition or as an alternative, each module may be implemented as a series of instructions encoded on a machine-readable storage medium of local device 400 and executable by processor 420. It should be noted that, in some embodiments, some modules are implemented as hardware devices, while other modules are implemented as executable instructions.

In some examples, the memory 422 can include a machine-readable storage medium that can store instructions for one or more of the modules. In some examples, a machine-readable storage medium may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium may be encoded with a series of executable instructions for distributed pattern discovery.

Figure 5:
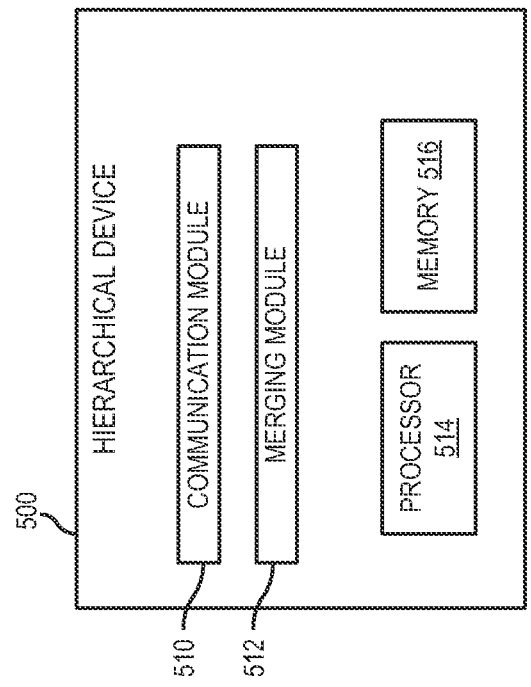
FIG. 5 is a block diagram of a hierarchical device, according to one example.

FIG. 5 is a block diagram of a hierarchical device, according to one example. In this example, the hierarchical device 500 includes a communication module 510, a merging module 512, a processor 514, and memory 516. As detailed herein, the hierarchical device 500 can also be a local device 400 that may generate a local frequent pattern tree, for example, using the processes of FIG. 6. In some examples, the hierarchical device 500 can perform the functions of a local device 400 and include modules used to perform such functionality. Further, the hierarchical device 500 can perform other functions, for example, merging local frequent pattern trees from a set of sub-nodes. The hierarchical device 500 can be used as a mid-level node or a master node.

In one example, the communication module 510 can receive multiple local frequent pattern trees from one or more sub-nodes. In some examples, the hierarchical device 500 can also be its own sub-node or provide itself with a local frequent pattern tree. The respective local frequent pattern trees can be based on multiple transactions.

The merging module 512 can perform merging functionality. In one example, the merging module 512 can assist with local tree reconstruction and pruning. In one example, the local nodes provide the hierarchical device with a local information table for the number of items occurrences during its tree construction. As described above, in the case of processing same transaction data on one local node, the local information can be a local item counter table while in the case of processing same transaction data across multiple nodes, the local information can be a local item and transaction pair counter table. As such, one or more of the local frequent pattern trees can include or be associated with a count of the number of times a particular potential pattern has occurred. As noted above, potential patterns can be detected in activities and/or transactions.

In one example, one of the local frequent pattern trees can include a partial pattern associated with a transaction. In this example, the count is below a threshold level, for example, below support threshold $\xi_1$. In another example, second one of the local frequent pattern trees includes or is associated with a second count of the number of times the same potential pattern has occurred. The second local frequent pattern tree includes a second partial pattern associated with the transaction. The second count can also be below the support threshold. In some examples, multiple other local frequent pattern trees can have a count associated with the potential pattern or other potential patterns under the threshold. If, when combined, the counts for the potential pattern are at and/or above the support threshold, the potential pattern is included in a global pattern tree as a frequent pattern. One or more potential patterns in the local frequent pattern trees can processed in this manner.

The merging module 512 can build a global item counter table. In one example, the global item counter table is sorted in descending order and the items that are less than the support threshold $\xi_1$ are removed. In other examples, the global item counter table need not be sorted to remove items that do not have threshold support. The communication module 510 can then send the global item counter table to the sub-nodes. Each sub-node gets the global item counter table from its respective hierarchical node or the master node and reconstructs and prunes its local frequent pattern tree according to the global item counter table.

Patterns extracted from a local frequent pattern tree are extracted as and sent to the master node directly or via hierarchical devices for tree merging. After receiving these transactions, the merging module 512 adds the transactions to its local frequent pattern tree to generate a global frequent pattern tree. Then, in one example, the global frequent pattern tree at merging module 512 is pruned by removing all paths in the tree whose length is less than $\xi_2$ and nodes in the tree whose support is less than the $\xi_1$. Then, the patterns extracted from the global pattern tree are returned to the other nodes. The communication module 510 can send the global pattern tree to the sub-nodes.

As noted above, the hierarchical device 500 can be implemented in the same manner as the local device 400. For example, hierarchical device 500 may be a server, a desktop computer, a workstation, a laptop computer, or any other computing device. As with processor 420, processor 512 may be a CPU, GPU, or microprocessor suitable for retrieval and execution of instructions and/or electronic circuits configured to perform the functionality of any of the modules 510, 512 described herein. Further, the implementation can include functionality of modules 410, 412, 414, 416 of the local device 400.

Figure 6:
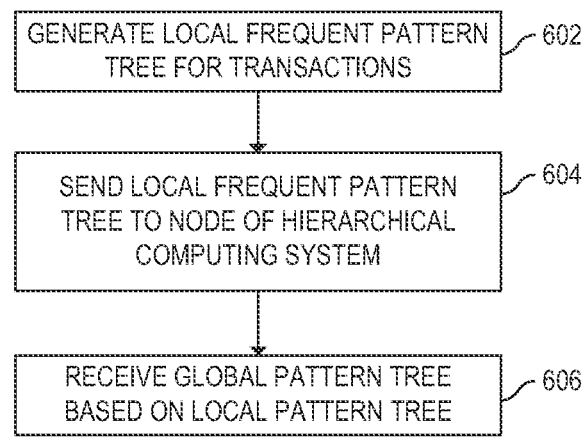
FIGS. 6-8 are flowcharts of methods for distributed pattern discovery, according to various examples.

FIG. 6 is a flowchart of a method for distributed pattern discovery, according to one example. The components for executing the method 600 may be implemented using a computing device, for example, local device 400. Method 600 may be implemented in the form of executable instructions stored on a machine-readable storage medium, and/or in the form of electronic circuitry.

The local device may perform various tasks, for example, SIEM tasks. In some examples, the local device may be used for distributed pattern discovery in addition to other tasks. In other examples, the local device may be dedicated to distributed pattern discovery.

The local device may generate a local frequent pattern tree for a plurality of transactions at 602. In one example, the local frequent pattern tree can be determined based on a pattern discovery profile. The pattern discovery profile can be received from a node, for example, a node higher in a hierarchy (e.g., from a master node or mid-level node). As such, the pattern profile may be received from a master node and/or another computing device. Multiple pattern profiles may also be used. In one example, the local frequent pattern tree is determined based on an analysis of activities stored in the database. The transactions can also be determined based on the pattern profiles.

In one example, generation of the local frequent pattern tree can include determining a local information table for the number of item occurrences during tree construction as described above. Different approaches can be used for the local information based on whether the processing of the transaction data is done solely at the local device (e.g., a local item counter table) or if part of the transaction may be processed at another device (e.g., a local item and transaction pair count table). The local information table from the local device as well as other local devices can be sent to a hierarchical node (e.g., a master or mid-level node) for processing.

This information can propagate up to the master node, which can build a global item counter table. The global item counter table can be processed so that global item count information is maintained for the items that are supported by at least a threshold number of transactions. The global item counter table is received at the local device.

The local device, as well as other local devices, can use the pruned global item count information for the items that are found at the respective local device. Based on this information, the items that did not make it into the pruned global item count list are pruned from the local frequent pattern tree. As such, the local frequent pattern tree can be pruned or compressed. Thus, less data travels when the local frequent pattern tree is transmitted to a higher node in the hierarchy. At 604, the local device sends the local frequent pattern tree to the node in a hierarchical computing system, where the node is on a greater or higher hierarchy than the local device. The local frequent pattern tree may be combined with other local frequent pattern trees at the higher node and sent up the hierarchy. A master node can generate a global frequent pattern tree based on the local frequent pattern tree and send the global pattern tree back to the local devices. The global pattern tree can be merged based on the local frequent pattern tree and other local pattern trees from devices on the same hierarchy as the local device. In some examples, local pattern trees from local devices from higher hierarchies and/or a master node can also be included in the global pattern tree.

At 606, the global pattern tree is received. As noted above, the global pattern tree can be based, at least in part, on the local pattern tree. In one example, the global pattern tree can be merged into the local pattern tree of the local device. Patterns can also be used perform a security function. For example, one of the patterns can be considered a threat, for example, a worm, a virus, etc. The local device can attempt to search out the pattern in the future to increase security of the computing system. In one example, when the pattern is found, the threat can be alerted and/or logged. In another example, when the pattern is found, the threat can be sandboxed or otherwise dealt with.

Figure 7:
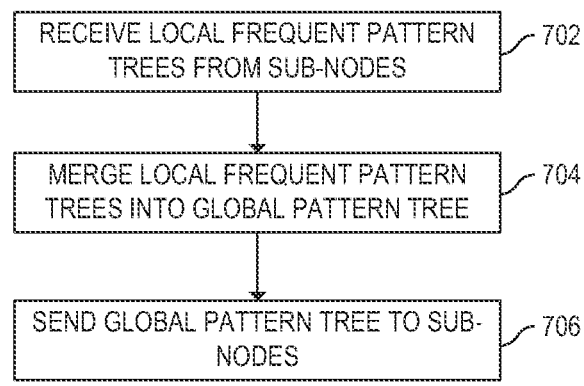

FIG. 7 is a flowchart of a method for distributed pattern discovery, according to one example. The components for executing the method 700 may be implemented using a computing device, for example, hierarchical device 500. Method 700 may be implemented in the form of executable instructions stored on a machine-readable storage medium, and/or in the form of electronic circuitry.

The hierarchical device may perform various tasks, for example, SIEM tasks. In some examples, the hierarchical device may be used for distributed pattern discovery in addition to other tasks, such as merging distributed pattern trees. In one example, the hierarchical device is a master node that merges distributed pattern trees.

At 702, the hierarchical device can receive a plurality of local frequent pattern trees from a plurality of sub-nodes. The respective local frequent pattern trees can be based on a plurality of activities or transactions. One or more of the local frequent pattern trees can include or be associated with a count for a number of times one of one or more potential patterns occur in the activities and/or transactions. The count information can be used in a merging process. In one example, the pattern tree can include a partial pattern associated with potential pattern.

At 704, the hierarchical device merges the local frequent pattern trees into a global pattern tree for the sub-nodes based, at least in part, on the count and counts of the other trees. In one example, one of the other trees can be a local tree created by the hierarchical device.

In one example, the count is below a threshold level. As such, if additional information is not provided, the pattern associated with the activity or transaction would not be included in the global pattern tree. In one example, a second one of the local frequent pattern trees includes a second count for a number of times the potential pattern occurred in other transactions and/or activities. The second local frequent pattern tree can include a second partial pattern associated with the activity or transaction. The second count can also be below the threshold level. However, if the combination of the counts and/or other associated counts is at least at the threshold level, the merging process includes potential pattern in the global pattern tree as a frequent pattern.

In one example, the merging can include determining how the count and the second count should be combined based on duplication information stored in the local frequent pattern trees. As discussed above, this can be based on annotations. Further, as noted above, merging can include adding the activities or transactions of the other local frequent pattern trees to its local frequent pattern tree to generate the global frequent pattern tree. In one example, the global frequent pattern tree, at a master node, can be pruned. In this example, the global frequent pattern tree can be pruned by removing all paths in a tree whose length is less than a threshold, for example, $\xi_2$. Further, all nodes in the tree whose support is less than $\xi_1$ can be removed. Then, at 706, the hierarchical device can send the global pattern tree to the sub-nodes.

Figure 8:
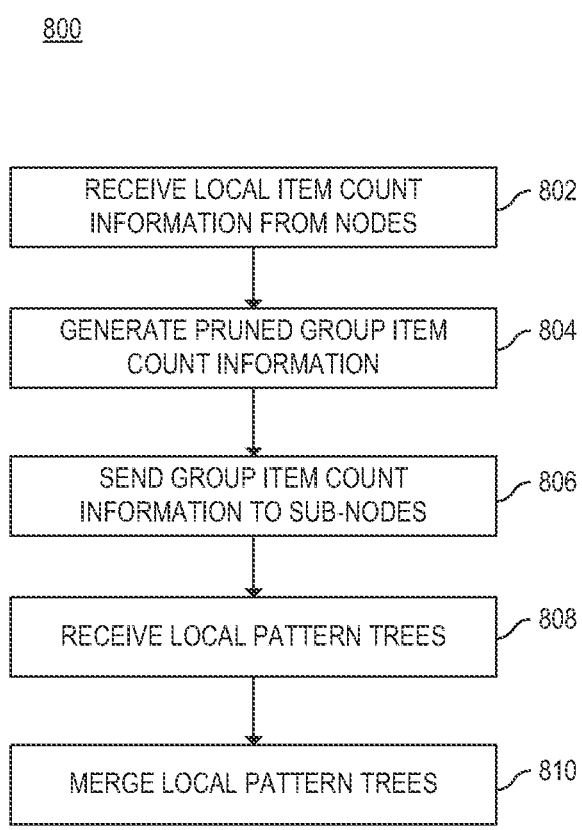

FIG. 8 is a flowchart of a method for distributed pattern discovery, according to one example. The components for executing the method 800 may be implemented using a computing device, for example, hierarchical device 500. Method 800 may be implemented in the form of executable instructions stored on a machine-readable storage medium, and/or in the form of electronic circuitry.

As noted above, the hierarchical device may perform various tasks, for example, SIEM tasks. In some examples, the hierarchical device may be used for distributed pattern discovery in addition to other tasks, such as merging distributed pattern trees. In one example, the hierarchical device is a master node that merges distributed pattern trees. In other examples, the hierarchical device can be a mid-level node.

Method 800 can be used to generate group item count information to provide to sub-nodes to allow pruning of local frequent pattern trees. At 802, the hierarchical device receives local item count information from a plurality of local nodes. In one example, the hierarchical device can be considered a local node.

At 804, the item count information can be combined into group item count information. This item count information can be pruned. In one example, a potential pattern is determined to be a pattern if it meets at least a threshold support. As such, if the item count information does not meet the support for the potential pattern, the items used to create the potential pattern can be pruned from the pruned global item count information.

At 806, the group item count information is sent to the sub-nodes. The group item count information can be processed by the sub-nodes to generate pruned local pattern trees. The local pattern trees can be returned to the hierarchical node. At 808, the hierarchical node receives the local pattern trees from the sub-nodes. Then, at 810, the hierarchical node merges the local pattern trees.

As noted above, if the potential pattern meets a pre-defined pattern length. As such, the pattern trees, when merged into a group local frequency pattern tree, can be pruned if the potential patterns do not meet a predefined threshold for pattern length, (e.g., $\xi_2$).

In one scenario, the hierarchical device is a master node and sends the merged group local frequency pattern tree to the sub-nodes as a global pattern tree.

In another scenario, group item count information can be forwarded to the master node after being combined, but not pruned at the hierarchical device. Further, in one scenario, mid-level nodes can be responsible for combining item count information and/or local pattern trees, but forwards this information to a master node for pruning. As such, actions can be performed in parallel at different nodes.

Moreover, processing of count information can occur separately from processing and merging of local frequent pattern trees. This advantageously allows for pruning of the trees without sending each of the potential patterns to the device used for merging. In one example, the potential patterns that meet support and/or length parameters based on the count information are included in local frequent pattern trees sent to the node responsible for merging.

In certain examples, approaches described herein can build on a single node Frequent Pattern-Growth tree algorithm. The approaches can utilize divide and conquer techniques that can use two scans of the database being analyzed. The Frequent Pattern-Growth algorithm computes a list of frequent items sorted by its frequency during its first database scan. In one example, this can be sorted in descending order based on the frequency. In the second scan, the database is compressed into a tree structure, in which patterns are mined according to its support and length criteria.

What is claimed is:

1. A system for distributed pattern discovery comprising:
a node comprising a processor and memory to:
receive a plurality of local frequent pattern trees from a plurality of sub-nodes, wherein the respective local frequent pattern trees are each based on a plurality of transactions;
merge the local frequent pattern trees into a global pattern tree for the sub-nodes;
send the global pattern tree to the sub-nodes, wherein one of the local frequent pattern trees is associated with a count of times a potential pattern occurs in the transactions associated with the one local frequent pattern tree,
wherein the one local frequent pattern tree includes a partial pattern associated with one of the transactions,
wherein the count is below a threshold level,
wherein a second one of the local frequent pattern trees includes a second count of times the potential pattern occurs in the transactions associated with the second one local frequent pattern tree,
wherein the second one local frequent pattern tree includes a second partial pattern associated with the potential pattern,
wherein the second count is below the threshold level, and
wherein the global pattern tree is used to perform a security function.

2. The system of claim 1, wherein the potential pattern is included in the global pattern tree as a frequent pattern if the count and second count combined is at least at the threshold level.

3. The system of claim 2, further comprising:
a first one of the sub-nodes including another processor and memory to:
generate the one local frequent pattern tree;
send the one local frequent pattern tree to the node;
receive the global pattern tree; and
use the one local frequent pattern tree and the global pattern tree to perform the security function.

4. The system of claim 3, wherein the one transaction is one or more security events.

5. The system of claim 3, wherein the one local frequent pattern tree is updated based on the global pattern tree.

6. The system of claim 2, wherein the merge includes determining how the count and the second count should be combined based on duplication information stored in the one local frequent pattern tree and the second one local frequent pattern tree.

7. The system of claim 1, wherein the security function includes at least one of: flagging a transaction, sandboxing an item, and sending an alert.

8. The system of claim 1, wherein the local frequent pattern trees are based on at least one pattern discovery profile.

9. A non-transitory machine-readable storage medium for distributed pattern discovery storing instructions that, if executed by at least one processor of a device, cause the device to:
generate a local frequent pattern tree of potential patterns for a plurality of transactions;
send the local frequent pattern tree to a node of a hierarchical computing system, wherein the node is on a greater hierarchy than the device, wherein a count is associated with a first one of the potential patterns that is below a threshold level;
receive a global pattern tree that is merged based on the local frequent pattern tree and other local pattern trees from a plurality of devices on a same hierarchy of the device, wherein the first one potential pattern is included in the global pattern tree if the count and a second count associated with the first one potential pattern associated with one of the other local pattern trees is greater than the threshold level; and
use the local frequent pattern tree and the global pattern tree to perform a security function.

10. The non-transitory machine-readable storage medium of claim 9, further comprising instructions that, if executed by the at least one processor, cause the device to:
receive a pattern discovery profile from the node, wherein the node is a master node,
wherein the local frequent pattern tree is generated based on the pattern discovery profile, and
wherein the local frequent pattern tree includes a transaction annotation that identifies the respective transactions that contribute to the local frequent pattern tree.

11. The non-transitory machine-readable storage medium of claim 9, wherein the security function includes at least one of: flagging a transaction, sandboxing an item, and sending an alert.

12. The non-transitory machine-readable storage medium of claim 9, further comprising instructions that, if executed by the at least one processor, cause the device to: update the local frequent pattern tree based on the global pattern tree.

13. A method for distributed pattern discovery comprising:
receiving, at a node, a plurality of local frequent pattern trees of potential patterns from a plurality of sub-nodes, wherein each of the respective local frequent pattern trees are based on a plurality of activities, wherein one of the local frequent pattern trees is associated with a count for a number of times one of the potential patterns has occurred in the activities;
merging the local frequent pattern trees into a global pattern tree for the sub-nodes based, at least in part, on the count;
sending the global pattern tree to the sub-nodes,
wherein the count is below a threshold level,
wherein a second one of the local frequent pattern trees is associated with a second count for a number of times the one potential pattern has occurred,
wherein the second count is below the threshold level, and
wherein the one potential pattern is included in the global pattern tree if the count and second count combined is at least at the threshold level; and
using the global pattern tree to perform a security function.

14. The method of claim 13, wherein the merging includes determining how the count and the second count should be combined based on duplication information stored in the one local frequent pattern tree and the second one local frequent pattern tree.

15. The method of claim 13, wherein the security function includes at least one of: flagging a transaction, sandboxing an item, and sending an alert.

16. The method of claim 13, wherein the local frequent pattern trees are based on at least one pattern discovery profile.

17. The method of claim 13, further comprising: updating, at one of the sub-nodes, the one local frequent pattern tree based on the global pattern tree.

* * * * *